Figures 1, 2:
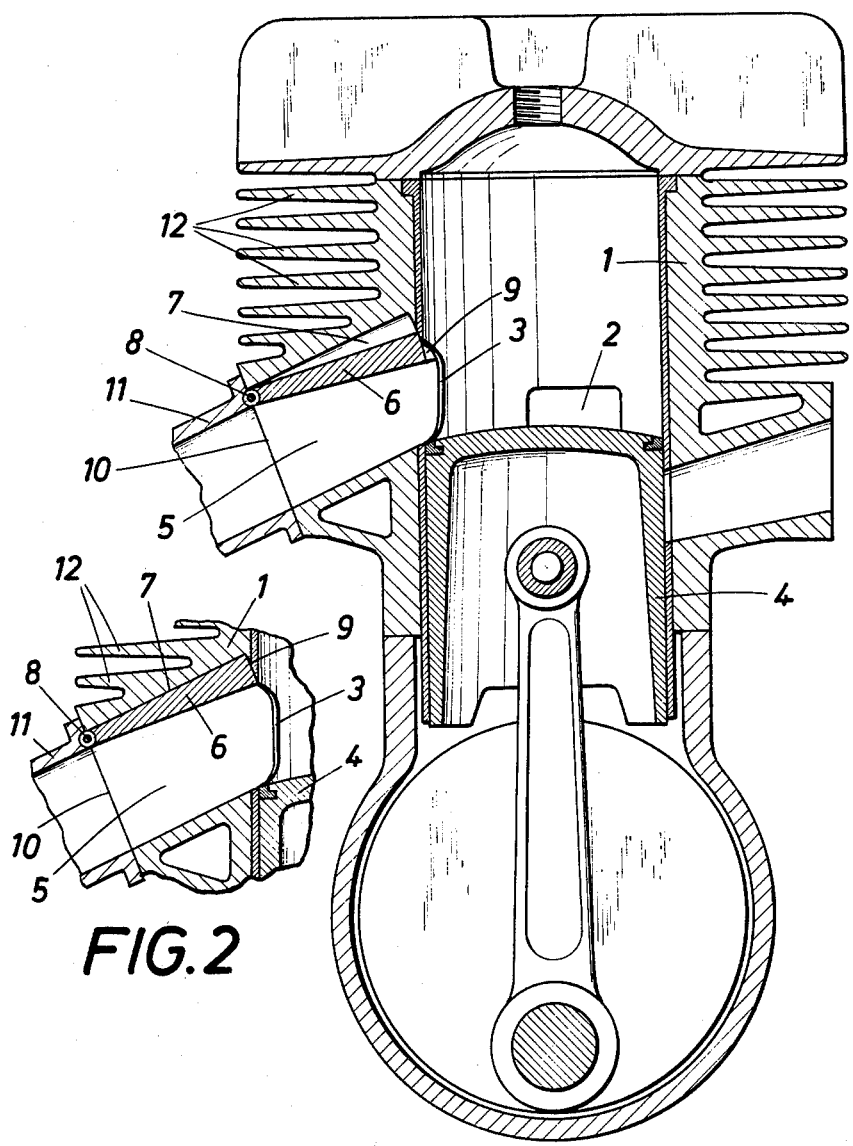

United States Patent [19]

Holzleitner

[11] 4,391,234

[45] Jul. 5, 1983

[54] INTERNAL COMBUSTION ENGINE COMPRISING MEANS FOR CONTROLLING THE AXIAL EXTENT OF A PORT IN A CYLINDER

[75] Inventor: Johann Holzleitner, Gunskirchen, Austria

[73] Assignee: Bombardier-Rotax G.m.b.H., Gunskirchen, Austria

[21] Appl. No.: 321,939

[22] Filed: Nov. 16, 1981

[30] Foreign Application Priority Data

Dec. 18, 1980 [AT] Austria ............................. 6172/80

[51] Int. Cl.³ .................... F02D 9/06; F02B 75/02
[52] U.S. Cl. ......................... 123/65 V; 123/65 PE; 123/323
[58] Field of Search ............ 123/323, 65 V, 65 PE, 123/65 P

[56] References Cited

U.S. PATENT DOCUMENTS

4,202,297  5/1980  Oku et al. .................... 123/65 PE
4,341,188  7/1982  Nerstrom .................. 123/65 PE X

FOREIGN PATENT DOCUMENTS

953128  5/1956  Fed. Rep. of Germany .
329701  6/1903  France ............................. 123/652
640466  4/1928  France ............................. 123/652

Primary Examiner—Wendell E. Burns
Attorney, Agent, or Firm—Kurt Kelman

[57] ABSTRACT

In an internal-combustion engine comprising at least one cylinder having a port and a piston which is reciprocable to open and close said port, the effective axial extent of said port is adapted to be reduced by a restricting member, which is movably mounted adjacent to a flow passage which adjoins said port. The restricting member has a restricting edge and is movable to a restricting position in which said restricting edge is substantially flush with the peripheral surface of the cylinder bore. The restricting member defines the exhaust passage on one side thereof adjacent to the exhaust port. In order to improve the cooling of the cylinder and the exhaust gas flow, the restricting member constitutes a hinged member, which is pivoted on an axis at that end which is opposite to the restricting edge.

4 Claims, 2 Drawing Figures

INTERNAL COMBUSTION ENGINE COMPRISING MEANS FOR CONTROLLING THE AXIAL EXTENT OF A PORT IN A CYLINDER

This invention relates generally to an internal combustion engine comprising means for controlling the axial extent of a port formed in the peripheral surface of a cylinder bore. More specifically, the invention to a two-stroke-cycle internal combustion engine having at least one cylinder formed with an exhaust port, a piston which is reciprocable in said cylinder and adapted to open and close said exhaust port, an exhaust passage connected to the exhaust port, and means for adjusting the exhaust time, which means comprise a pivoted restricting member, which defines the exhaust passage on one side thereof adjacent to the exhaust port, said restricting member having a restricting edge which in the restricting position of the restricting member is generally flush with the peripheral surface of the cylinder bore.

In order to ensure that two-stroke-cycle internal combustion engines can have a high power capacity at high speed, a high volumetric efficiency is required and the charge losses must be minimized. This can be accomplished by an early opening of the exhaust passage in conjunction with a utilization of resonance effects. But owing to the relatively large height of the exhaust port, that tuning of the exhaust system to the maximum power capacity of the internal combustion engine involves in the medium speed range not only an appreciable decrease of the useful stroke but also a large increase of the charge losses. As a result, the torque decreases so that the specific fuel consumption increases greatly. A higher torque in conjunction with a lower fuel consumption can be obtained at lower speeds only if the time for which the exhaust port is open is shortened.

For this purpose it has already been suggested to provide two axially spaced apart exhaust ports and a slider, which is adapted to be adjusted parallel to the axis of the cylinder bore and adapted to close one of said exhaust ports. In such an arrangement, the piston will not open the exhaust passage until the control edge of the piston has reached the lower exhaust port. That known design has the advantage that the branching of the exhaust passage adversely affects the flow of the exhaust gases by turbulence particularly under maximum loads and that the cooling of the cylinder in its hottest portion above the exhaust ports is substantially hindered by the control slider.

In another known arrangement for controlling the exhaust time, a rotatably mounted restricting roller extends tangentially to the cylinder through the exhaust passage close to the exhaust port and has a concave recess which conforms to the peripheral surface of the cylinder bore. A restricting edge is formed at the intersection of that recess and of an opening which extends through the restricting roller and conforms to the cross-section of the exhaust passage. That restricting edge can restrict the height of the exhaust port in dependence on the angular position of the restricting roller so that the latter can be used to control the time for which the exhaust duct is open. But that arrangement involves a relatively high structural expenditure and also hinders the cooling of the cylinder because the restricting roller cannot properly perform its function unless it protrudes to a large extent into the triangular region between the cylinder bore and the exhaust passage. Besides, the flow conditions will be adversely affected by a dead space formed behind the restricting edge when the restricting roller is in its restricting position.

It is an object of the invention to provide a two-stroke-cycle internal combustion engine which is of the kind described first hereinbefore and in which the cooling of the cylinder and the conditions of flow are improved.

This object is accomplished in accordance with the invention in that the restricting member constitutes a hinged member, which is pivoted at that end which is opposite to the restricting edge. Because the restricting member constitutes a hinged member, a relatively shallow recess in the boundary surface of the exhaust passage is sufficient for accommodating the restricting member so that the dissipation of heat from the cylinder member in a radially outward direction will not be hindered. As the restricting member is pivoted on an axis at that end which is opposite to the restricting edge, the conditions of flow in the exhaust passage are hardly changed, particularly as the hinged restricting member may have a substantial length so that a small angular movement of the restricting member will be sufficient for the desired reduction of the effective height of the exhaust port.

Such hinged restricting member may be mounted and installed in a simple manner if the pivotal axis of the restricting member lies at the joint between the exhaust passage of the cylinder and an attached exhaust stub. In such an arrangement, a hinged restricting member having the largest possible length can be used where the other dimensions are not changed.

To avoid the formation of a gap between the edge of the exhaust port in the cylinder and the restricting edge of the hinged restricting member in its restricting position, a further feature of the invention resides in that the hinged restricting member tapers from the restricting edge to its pivotal axis with an angle of taper corresponding to the range of the angular movement of the damper.

An embodiment of the invention is shown by way of example on the drawing, in which FIG. 1 is an axial sectional view taken through the cylinder of a two-stroke-cycle internal combustion engine provided in accordance with the invention with means for controlling the exhaust time and FIG. 2 is a view that is similar to FIG. 1 and shows the hinged restricting member in its inoperative position.

The internal-combustion engine shown in FIG. 1 comprises a cylinder 1 which has an inlet port 2 and an exhaust port 3, which is adjoined by an exhaust passage 8. Both ports 2 and 3 are opened and closed by a piston 4, which is reciprocable in the cylinder 1 and is shown at its bottom dead center. For the control of the effective height of the exhaust port 3 and of the time for which the exhaust duct 5 succeeding the exhaust port 3 is open, a hinged restricting member 6 is provided, which is accommodated in a suitable recess of the boundary wall of the passage and is pivoted on a pivot 8, which is disposed at that end of the hinged restricting member that is remote from the cylinder. At its free end, the hinged restricting member 6 is formed with a restricting edge 9. In the restricting position of the hinged restricting member, shown in FIG. 1, the restricting edge 9 is flush with the peripheral surface of the cylinder bore so that the restricting edge 9 of the hinged restricting member 6 will determine the effective height of the exhaust port when the hinged restricting member 6 has been angularly moved from the inoperative position shown in FIG. 2 to the restricting position shown in FIG. 1. In that case, the exhaust port is opened later by the descending piston 4 so that the operation of the internal-combustion engine can be adapted to lower speeds.

To permit a simple mounting of the hinged restricting member 6, the pivot 8 is disposed in the joint 10 between the cylinder 1 and an exhaust stub 11 which is connected thereto and communicates with the exhaust passage 5. The pivot 8 may protrude from the cylinder and may be used to actuate the hinged restricting member.

As is particularly apparent from FIG. 1, the hinged restricting member 6 will not adversely affect the flow path for the exhaust gases even when the height of the port has been reduced because the hinged restricting member is so long that it can be moved only through a small angle so that there is no abrupt change in the direction of flow at the joint between the hinged restricting member 6 and the adjacent boundary surface of the stub 11. Besides, the hinged restricting member 6 is so thin that the dissipation of heat by the cooling fins 12 is not adversely affected.

A control device may be provided for adjusting the hinged restricting member 6 in dependence on the load on the internal-combustion engine and the speed thereof.

When it is desired to control the inlet time, a damper may be similarly arranged at the inlet port 2. For this reason the invention relates generally to a two-stroke-cycle internal combustion engine comprising cylinder structure 1, which defines a cylinder bore and is formed with a port 3, which has an axial extent along the axis of the cylinder bore. The cylinder structure 1 is also formed with a flow passage 5, which at one end adjoins the port 3 at one end of said axial extent. A piston 4 is axially reciprocable in the cylinder bore and adapted to open and close the port 3. A hinged restricting member 6 is provided, which defines the flow passage 5 on one side thereof and has at one end a restricting edge 9, which faces the port 3 and extends generally in the peripheral direction of the adjacent portion of the inside peripheral surface which defines the cylinder bore. At its end opposite to the restricting edge 9, the hinged restricting member 6 is pivoted by means of a pivot 8. The hinged restricting member 6 is angularly movable between a full-flow position, in which the restricting edge 9 is clear of the port 3, and a restricting position, in which the restricting edge 9 extends across the port 3 intermediate its axial extent and is substantially flush with the inside peripheral surface which defines the cylinder bore.

What is claimed is:

1. In a two-stroke-cycle internal combustion engine comprising
   cylinder structure having an inside peripheral surface which defines a cylinder bore and is formed with a port which has an axial extent along the axis of said cylinder bore, said cylinder structure being formed with a flow passage which at one end adjoins said port and has a boundary surface portion which adjoins said port at one end of said axial extent,
   a piston, which is axially reciprocable in said cylinder bore and adapted to open and close said port, and
   a pivoted restricting member which defines said flow passage on one side thereof adjacent to said port and has a restricting edge which faces said port and extends generally in the peripheral direction of the adjacent portion of said inside peripheral surface, said restricting member being angularly movable between a full-flow position, in which said restricting edge is clear of said port, and a restricting position, in which said restricting edge extends across said port intermediate said axial extent and is substantially flush with said inside peripheral surface,
   the improvement residing in that
   said restricting member constitutes a hinged member, which is formed with said restricting edge at one end and is pivoted at its end that is opposite to said restricting edge.

2. The improvement set forth in claim 1, wherein said port is an exhaust port and
   said flow passage is an exhaust passage.

3. The improvement set forth in claim 2 is applied to an internal combustion engine comprising an exhaust stub which communicates with said exhaust passage and defines a joint with said cylinder structure at said exhaust passage, wherein
   said hinged plate is pivoted on an axis extending through said joint.

4. The improvement set forth in claim 1, wherein said hinged member is movable through a predetermined angle from said full-flow position to said restricting position and
   said hinged member tapers from said restricting edge to said opposite end with an angle of taper that is equal to said predetermined angle.

* * * * *